July 21, 1942.    L. FOSSETT    2,290,422
ELECTRIC SIGNALING SYSTEM
Filed Feb. 1, 1941
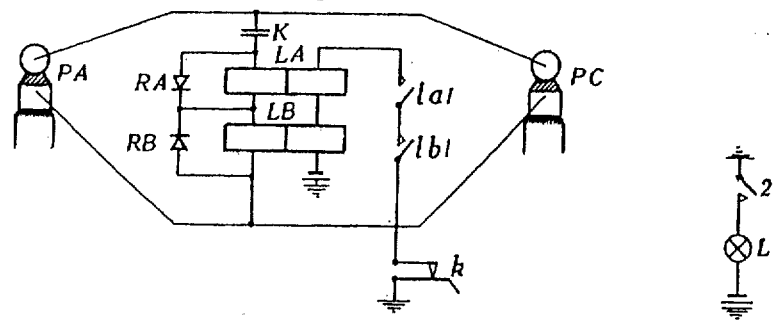
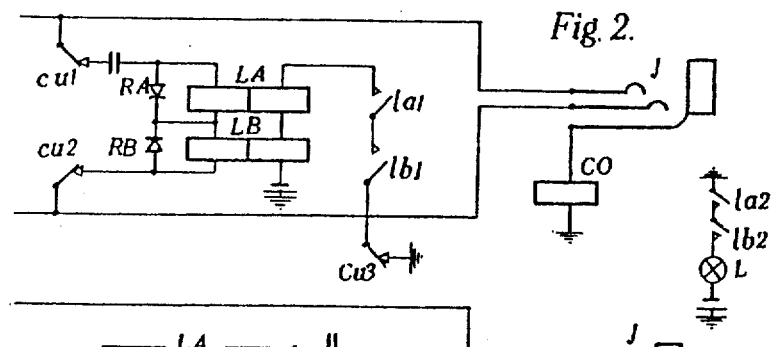
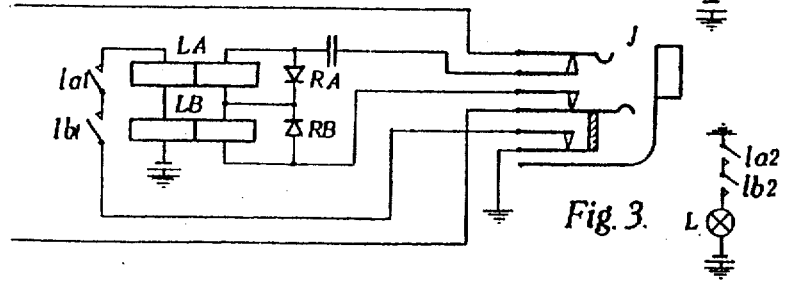
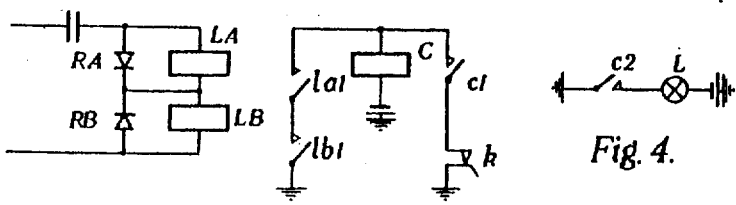
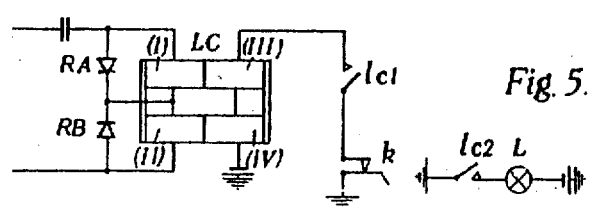
INVENTOR
LESLIE FOSSETT
BY
ATTORNEY

UNITED STATES PATENT OFFICE 2,290,422

ELECTRIC SIGNALING SYSTEM

Leslie Fossett, Bexleyheath, England, assignor to Siemens Brothers & Co. Limited, London, England, a British company Application February 1, 1941, Serial No. 376,970
In Great Britain February 5, 1940

3 Claims. (Cl. 179—76)

This invention relates to electric signaling systems and more particularly to systems in which a signal or indication is given consequent on the operation of apparatus by alternating current. It has a special field of usefulness in telephone systems.

In an alternating current electric signaling system in which kicks of unidirectional current may occur in the signaling wires, for instance by the charge or discharge of a condenser, the apparatus, the operation of which is to give a signal or indication, may be operated by such a kick and a false signal or indication given.

The present invention has in view improved means of a simple nature whereby such false signals are prevented without the provision of delay means exterior to the signal receiving apparatus or reduction in sensitivity of the apparatus.

According to the present invention the signal receiving apparatus and its connection to the signaling circuit are so arranged that one effect is produced by one half cycle of alternating current and another effect is produced by a succeeding half cycle in the opposite direction and a signal is given only if the first effect has persisted until the second effect has been produced and both effects are present simultaneously. The effects are the production of magnetic fluxes in a magnetic circuit and these fluxes may be produced in different relays or in one relay. In the former case the production of a magnetic flux by one half cycle of current may bring the operation of one of the relays and the production of a flux by the following half cycle of current may bring about the operation of another of the relays and in the latter case the operation of the relay may result from the existence of opposing fluxes consequent on the persistence of the flux due to one half cycle after a flux due to the succeeding half cycle has been produced. Registering or locking arrangements may be provided to register the occurrence of these effects and only when the existence of simultaneous effects has been so registered is a persistent circuit closed to give a signal.

In carrying out the invention two windings of a relay or the windings of two relays are connected to the signaling wires, a rectifier being associated with each winding, the two rectifiers being so connected that one winding is energised by current of one half cycle of alternating current and the other winding is energised by current of the succeeding half cycle. In the case of separate relays the release of the first to be operated is delayed while the flux in the other relay is growing thus both relays will be operated for a short time and during this time a registering or locking circuit may be closed. The delay may be brought about by connecting the rectifiers as shunts to the line windings of the relays. In the case of a single relay this may be of the shunt field type, with two line windings shunted respectively by oppositely connected rectifiers. The relays or relay may have locking windings connected over contacts of the two relays in series, there being one winding on each limb of the shunt field relay, or series connected contacts of each relay may close a circuit for a registering relay. The signal circuit may be closed by a contact of one of the line relays or serially connected contacts of both relays. In the first case if this relay should be operated by a unidirectional kick the operation will be of a transitory nature and a signal may be given although it may not be persistent.

In the application of the invention to a telephone system to give a signal in response to the reception of ringing current, the relays or windings of the single relay and the associated rectifiers may be connected to the signaling wires over a condenser and the connection may include contacts of a cut-off relay included in the sleeve circuit of a jack or break contacts of a jack. The locking circuit may also include similar contacts or the contacts of an answering key if the relays are connected in a cord circuit. The two line windings each with its rectifier may be connected in series across the signaling wires. If the windings and the rectifiers are in series a parallel connection of the combination across the signaling wires may be employed. A contact of each of the relays is included in the circuit of the signalling lamp but if there is no objection to a transitory signal, e. g. a flicker of the lamp, the lamp circuit may include a contact of only one of the relays.

Reference will now be had to the accompanying drawing in which different embodiments are illustrated diagrammatically. Figs. 1, 2 and 3 show arrangements in which two relays with locking windings forming a registering circuit are employed, Fig. 1 showing the relays connected in the cord circuit of a switchboard, Fig. 2 showing the relays connected to a branching jack and Fig. 3 showing the relays connected to a break jack all of which connections may be assumed to be in the circuit of a telephone switchboard. Fig. 4 shows an arrangement employing two relays with a separate registering circuit and Fig. 5 an arrangement showing the use of a shunt field relay.

Reference will first be had to Fig. 1. The signal receiving apparatus includes the relays LA and LB and the rectifiers RA and RB. The operating windings of the relays are the left-hand windings and these are connected in series with one another and a condenser K across the tips and rings of two plugs PA and PC. The left-hand winding of relay LA is shunted by rectifier RA and the left-hand winding of relay LB is shunted by rectifier RB. The right-hand windings are connected in series with one another and with serially connected contacts of each relay and break contacts $k$ of a key which in a telephone system may be the answering key. A contact 2 of one of the relays, or if desired, serially connected contacts of both relays are connected in the circuit of a supervisory lamp L.

If a unidirectional kick occurs on the line wires, due for instance to a condenser charge or discharge and the polarity is such that relay LA is operated, relay LB will in effect be short-circuited by rectifier RB. Similarly if the polarity of the kick is such that relay LB is operated relay LA will be short-circuited by rectifier RA. In either event only one relay will be operated and the locking circuit over the right-hand windings of the relays will not be completed. Contact 2 of the relay operated may close the circuit of the supervisory lamp L momentarily but no great disadvantage need arise from this. In any case a flash on lamp L can be avoided by including serially connected contacts of both relays in the lamp circuit. If alternating current is impressed on the line the first half cycle will operate one of the relays, for example relay LA, and the following half cycle will operate the other relay, in the example relay LB. The effect of rectifier RA will be to delay somewhat the release of relay LA and in any case by suitable design this delay may be caused to extend over a period until relay LB has been operated. As both relays are in an operated condition at the same time the locking circuit over their right-hand windings will be closed over contacts $la1$ and $lb1$ and key contacts $k$. The existence of the effects represented by the operation of both the relays is thus registered and lamp L will continue to glow steadily. The relays may be released and the lamp extinguished by the momentary depression of the key thereby opening contacts $k$.

The arrangement shown in Fig. 2 is similar to that shown in Fig. 1. The signal receiving apparatus is here connected over contacts $co1$ and $co2$ of a cut-off relay to a pair of line wires terminating on the springs of a jack J. The locking windings include a contact $co3$ of the cut-off relay in place of the key contacts $k$ in Fig. 1. The cut-off relay CO is connected to the sleeve of the jack in the well-known manner. The operation of the apparatus is exactly as described in connection with Fig. 1, the circuit of lamp L being closed when both relays are in an operated condition at the same time. When a plug is inserted into the jack, relay CO is operated and the signal receiving apparatus is disconnected from the line at contacts $co1$ and $co2$ and contact $co3$ opens the locking circuit thereby bringing about the extinguishing of lamp L. This arrangement may be used for receiving a calling signal, the lamp L being a calling lamp.

In Fig. 3 the signal receiving apparatus is shown connected over springs of a break jack J to a line terminating on the line springs of the jack. In this arrangement jack springs take the place of the contacts of the cut-off relay of Fig. 2. The operation of the signal receiving apparatus is as described in connection with Fig. 1.

In the arrangement shown in Fig. 4 the relays LA and LB have only a single winding each. A further relay C is provided the operating circuit of which includes serially connected contacts $la1$ and $lb1$ of relays LA and LB. Relay C also has a locking circuit including contact $c1$ and another contact $k$, for example break contacts of a key, for the purpose of unlocking the relay. The circuit of lamp L may be closed by a contact of any of the relays, preferably by a contact $c2$ of relay C so that flashing of the lamp due to unidirectional kicks is avoided. In this arrangement relays LA and LB are operated when alternating current is received, the first relay to be operated not releasing before the second has operated. When both relays are in an operated condition simultaneously the operating circuit of relay C is closed over contacts $la1$ and $lb1$ and relay C locks up over contact $c1$ and contact $k$ and at contact $c2$ closes the circuit of lamp L. Relay C is released and the lamp extinguished by opening contact $k$ by suitable means.

In Fig. 5 an arrangement employing a shunt field relay LC is employed. This relay has two line windings (I) and (II) associated with the magnetic circuit in the well-known manner. It has also two locking windings (III) and (IV). The line windings are shunted by rectifiers RA and RB in a similar manner to relays LA and LB of the preceding figures. Current through one of the line windings is ineffective in operating the relay as there would be no exterior flux. If one line winding is so energised, the flux due to it does not die away before the other line winding is energised and the fluxes due to both windings being energised oppose one another and the armature is attracted. Attraction of the armature closes contact $lc1$ and the locking windings (III) and (IV) of the relay are energised in the same sense as the line windings (I) and (II) and the relay remains in an operated condition. Contact $lc2$ closes the circuit of lamp L. The relay is released by the opening of contact $k$ in some suitable manner.

By a suitable arrangement of the resistance of the windings of the relays in the registering circuit the lamp L may be included in that circuit in any of the arrangements described and illustrated.

I claim:

1. In combination, a line upon which currents of opposite polarity are impressed at different times, a relay connected to said line and operated only by current of a particular polarity when such current is impressed upon said line, a normally ineffective locking circuit for said relay, and means controlled by current of the opposite polarity, if same is impressed upon said line within a predetermined interval after current of said particular polarity has ceased to be impressed thereupon, for rendering said locking circuit effective to maintain said relay operated.

2. In combination, a line over which current flows in different directions at different times, two relays connected to said line, one of said relays operated only by current flowing over said line in one direction and the other of said relays operated only by current flowing over said line in the opposite direction, and a locking circuit controlled by said relays for maintaining said relays operated whenever they have been operated substantially concurrently by current flowing over said line.

3. In combination, two relays, means connecting the windings of said relays in series in a circuit, a rectifier bridging the winding of one of said relays to render that relay non-responsive to current flowing over said circuit in a particular direction, a rectifier bridging the winding of the other of said relays to render that relay non-responsive to current flowing over said circuit in the opposite direction, a normally open contact on each of said relays, and a locking circuit containing said two contacts in series for maintaining said relays operated independently of said first circuit if said relays are operated concurrently over said first circuit.

LESLIE FOSSETT.